United States Patent [19]

Stephenson et al.

[11] 4,027,829

[45] June 7, 1977

[54] FLYWHEEL AND CLUTCH MECHANISM FOR SAFETY BELT RETRACTOR

[75] Inventors: Robert Larry Stephenson, Sterling Heights; Arduino Colasanti, East Detroit, both of Mich.

[73] Assignee: Allied Chemical Corporation, Morris Township, N.J.

[22] Filed: May 2, 1975

[21] Appl. No.: 574,058

[52] U.S. Cl. .................. 242/107.4 A; 242/107.4 B
[51] Int. Cl.$^2$ .................... A62B 35/02; B65H 75/48
[58] Field of Search ............. 242/107.4 A, 107.4 B; 297/388; 280/744–747

[56] References Cited

UNITED STATES PATENTS

| | | | |
|---|---|---|---|
| 3,446,454 | 5/1969 | Kovacs et al. | 242/107.4 B |
| 3,741,496 | 6/1973 | Beller | 242/107.4 B |

*Primary Examiner*—Stanley N. Gilreath
*Assistant Examiner*—John M. Jillions
*Attorney, Agent, or Firm*—Roger H. Criss; John P. Kirby, Jr.

[57] ABSTRACT

An improved flywheel and clutch mechanism is adapted for use in a safety belt retractor which has a vehicle-sensitive mechanism and a pawl. The improvement includes: a polymeric flywheel, a clutch plate, a mechanical member, a biasing means and a retaining means. The flywheel has a recess in the interior thereof. An outer circumferential surface of the flywheel has ratchet teeth thereon. The pawl is located adjacent to the ratchet teeth and can engage a ratchet tooth when the pawl is actuated by the vehicle-sensitive mechanism. The clutch plate is disposed within the recess. The mechanical member is rigidly affixed to the center of the clutch plate and extends from the exterior side of the clutch plate. The biasing means is disposed in the recess of the flywheel adjacent to an interior surface of the clutch plate. The biasing means presses against the clutch plate in a direction urging the clutch plate away from the flywheel. The retaining means is disposed around the outer circumferential ridge of the flywheel. The flywheel and clutch mechanism includes three embodiments: a lower torque embodiment; an intermediate torque embodiment; and a higher torque embodiment.

7 Claims, 15 Drawing Figures

FLYWHEEL AND CLUTCH MECHANISM FOR SAFETY BELT RETRACTOR

BACKGROUND OF THE INVENTION

The invention relates to safety belt retractors for use in vehicles, such as automobiles, to restrain an occupant, either a passenger or a driver, in his seat during emergency conditions. More particularly, the invention relates to safety belt retractors which are belt sensitive, that is, sensitive to certain movements of the safety belt. The invention may also be used in retractors which are dual sensitive, that is, sensitive to certain movements of the vehicle and sensitive to certain movements of the safety belt. Still more particularly, the invention relates to improvements in a flywheel and clutch mechanism of a retractor, such as the retractor diclosed and claimed in U.S. Pat. No. 3,918,658, filed in the name of H. Beller on June 15, 1973, entitled "Seat Belt Retractor Having Inertial Device Activated By Two Stimuli". The improvements of the present invention allow the use of less expensive polymeric parts used in the flywheel and clutch mechanism of the retractor, as compared to the number of parts used in previous retractors, such as the retractor of U.S. Pat. No. 3,918,658. The improvements of the present invention also reduce the amount of wear on a pawl used with a pendulum mechanism of a retractor, such as the retractor of U.S. Pat. No. 3,918,658. These improvements are significant bacause they simplify the manufacture and operation of the retractor and reduce the cost of the retractor.

Some prior art safety belt retractors include a vehicle sensitive mechanism, such as a pendulum mechanism, which locks the retractor and prevents further unwinding of the safety belt when the vehicle experiences a given magnitude of acceleration, deceleration, tipping or overturning. Such retractors are known as "vehicle sensitive retractors." Other prior art safety belt retractors include a belt sensitive mechanism, also known as a web sensitive mechanism, which locks the retractor when acceleration in withdrawal of the safety belt from the retractor exceeds a given magnitude. Still other prior art retractors include both a vehicle sensitive mechanism and a belt sensitive mechanism, such as the retractor of U.S. Pat. No. 3,918,658.

The vehicle sensitive mechanism of U.S. Pat. No. 3,918,568 includes a pendulum which causes a clutch to slip with reference to a flywheel. The belt sensitive mechanism of Pat. No. 3,918,658 uses the same clutch and flywheel. The clutch acts in conjunction with the flywheel, but the clutch acts as a separate component only for the vehicle sensitive mechanism, not for the belt sensitive mechanism. In the belt sensitive mechanism, the clutch turns with the flywheel as one unit to provide a mass and a moment of inertia which causes an actuating plate to rotate a limited distance. Prior art flywheels are usually made of die-cast metal, which is expensive to manufacture. For example, ratchet wheel 61 of U.S. Pat. No. 3,918,658 is made of a die-cast metal.

SUMMARY OF THE INVENTION

The retractor has a vehicle-sensitive mechanism which includes a pawl. The retractor also includes an improved flywheel and clutch mechanism. The improved flywheel and clutch mechanism includes: a polymeric flywheel, a clutch plate, a mechanical member, a biasing means and a retaining means.

The flywheel has an outer circumference and a planar surface extending from the outer circumference of the flywheel toward the center of the flywheel. The flywheel also has a ridge disposed around the outer circumference of the flywheel on at least one side of the planar surface and a recess in the interior of the flywheel. The recess is formed by the outer circumferential ridge and the planar surface. The ridge has an outer circumferential surface on the outer circumference of the ridge. The outer circumferential surface has ratchet teeth thereon. The vehicle-sensitive pawl is located adjacent to the ratchet teeth, whereby the pawl can engage a ratchet tooth of the flywheel when the pawl is actuated by the vehicle-sensitive mechanism.

The clutch plate is disposed within the recess of the flywheel. The clutch plate has an interior surface disposed adjacent to the planar surface of the flywheel and an exterior surface on the opposite side of the clutch plate from the interior surface. The mechanical member is rigidly affixed to the center of the clutch plate and extends at least from the exterior side of the clutch plate. The biasing means is disposed in the recess of the flywheel adjacent to the interior surface of the clutch plate. The biasing means presses against the clutch plate in a direction urging the clutch plate away from the planar surface of the flywheel.

The retaining means is disposed around the outer circumferential ridge of the flywheel. The retaining means is adjacent to the exterior surface of the clutch plate. The retaining means extends partially from the outer circumferential ridge inwardly toward the center of the flywheel and retains the clutch plate in the recess of the flywheel against the bias of the biasing means.

The improved flywheel and clutch mechanism of the present invention includes three embodiments: a lower torque embodiment; and intermediate torque embodiment and a higher torque embodiment. The term "torque" refers to a force required to overcome a biasing means and turn the clutch plate and mechanical member with reference to the flywheel when the clutch plate and mechanical member are disposed within a recess of the flywheel.

In the lower torque embodiment, the biasing means includes: at least one cut-out portion in the planar surface of the flywheel. The cut-out portion is bent inwardly from the planar surface toward the recess of the flywheel and the clutch plate. As a result, the cut-out portion presses against the clutch plate. The mechanical member and the clutch plate rotate together as one unit with reference to the flywheel against a frictional force resulting from the press of the biasing means against the clutch plate when a predetermined, relatively low amount of torque is applied to the mechanical member.

In the intermediate torque embodiment, the biasing means is a circular leaf spring disposed between the planar surface of the flywheel and the interior surface of the clutch plate. The mechanical member and the clutch plate rotate together as one unit with reference to the flywheel against a frictional force resulting from the press of the biasing means against the clutch plate when a predetermined, relatively intermediate amount of torque is applied to the mechanical member.

In the high torque embodiment, the biasing means is also a circular leaf spring disposed in said recess of said flywheel between said planar surface of said flywheel and said interior surface of said clutch plate. The mechanical member extends through an opening in the center of the clutch plate, through the recess of said flywheel, through an opening in the center of said leaf spring and a portion of said mechanical member extends into an opening in the center of said flywheel. The mechanical member and the clutch plate rotate as one unit with reference to the flywheel. The mechanical member rotates within the opening in the center of the planar surface of the flywheel against a frictional force resulting from the press of the leaf spring against the clutch plate against the frictional resistance between the center of the planar surface of the flywheel and the portion of the mechanical member extending therein when a predetermined, relatively high amount of torque is applied to the mechanical member.

DETAILED DESCRIPTION

Figure 5:
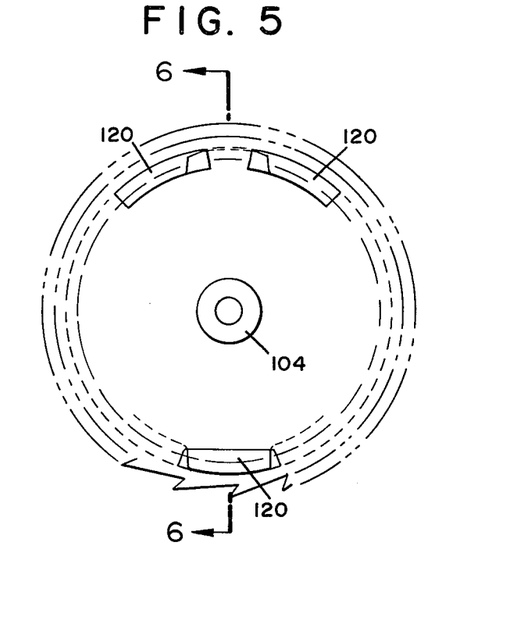
FIG. 5 is a front elevational view of an intermediate torque embodiment of the present invention; showing a flywheel, clutch plate, biasing means and mechanical member.
Figure 6:
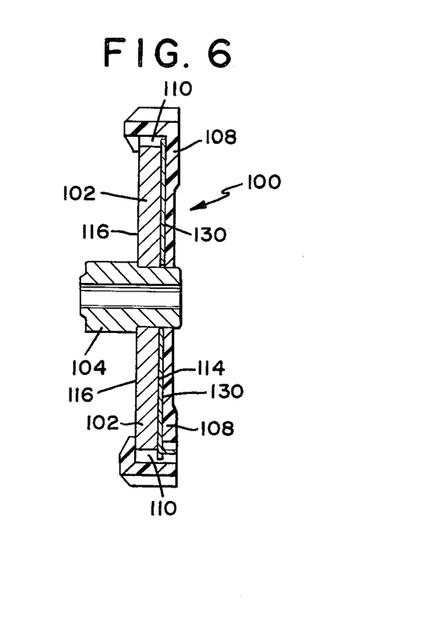
FIG. 6 is a sectional veiw of FIG. 5 along the lines 6—6 in FIG. 5.
Figure 7:
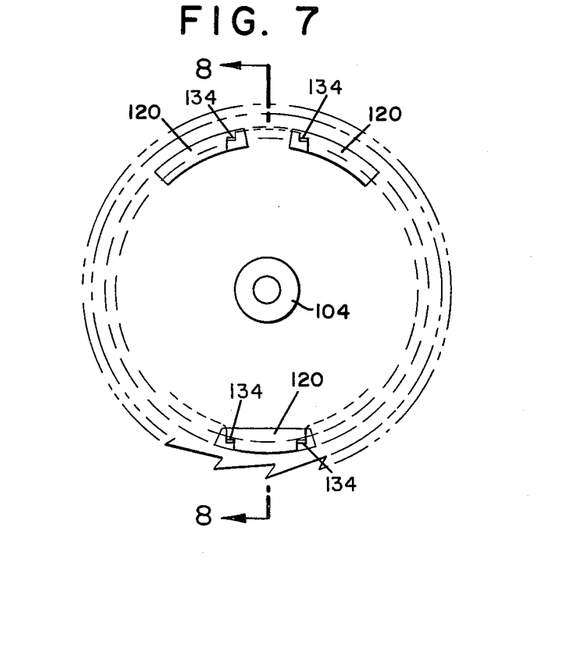
FIG. 7 is a front elevational view of a high torque embodiment of the present invention, showing a flywheel, clutch plate, biasing means and mechanical member.
Figure 8:
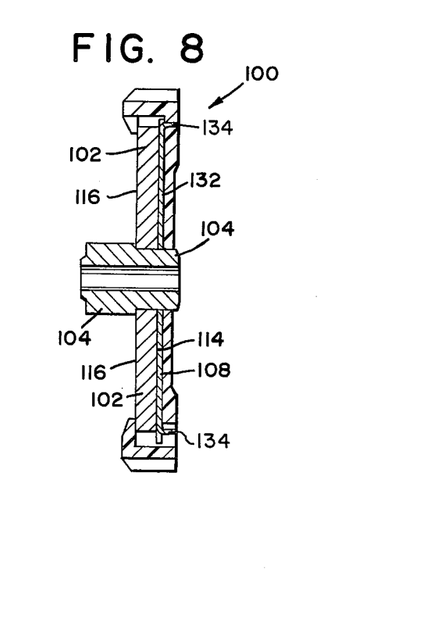
FIG. 8 is a sectinal view of FIG. 7 along the lines 8—8 in FIG. 7.

Referring to FIGS. 1–8, the emproved flywheel and clutch mechanism of the present invention includes three embodiments: a lower torque embodiment, illustrated in FIGS. 1–4; an intermediate torque embodiment, illustrated in FIGS. 5–6; and a high torque embodiment, illustrated in FIGS. 7–8. In all three embodiments, the improved flywheel and clutch mechanism includes: a polymeric flywheel 100 (best shown in FIGS. 2, 6 and 8), clutch plate 102 (FIGS. 3–8), a mechanical member 104 (FIGS. 3–8), a biasing means and a retaining means 105. The term "polymeric" refers to a plastic or nylon material.

The flywheel 100 has an outer circumference and a planar surface 108 extending from the outer circumference of the flywheel 100 toward the center 111 of the flywheel 100. The flywheel 100 also has a ridge 106 disposed around the outer circumference of the flywheel 100 on at least one side of the planar suface 108. The flywheel 100 has a recess 110 in the interior of the flywheel 100. The recess 110 is formed by the outer circumferential ridge 106 and the planar surface 108 and extends to the center of the flywheel 100. The ridge 106 has an outer circumferential surface on the outer circumference of the ridge 106. The outer circumferential surface has ratchet teeth 112 thereon. A vehicle-sensitive pawl, which may also be plastic, is located adjacent to the ratchet teeth 112, whereby the pawl can engage a ratchet tooth 112 of the flywheel 100 when the pawl is actuated by the vehicle-sensitive mechanism.

The clutch plate 102 is disposed within the recess 110 of the flywheel 100. The clutch plate 102 has an interior surface 114 disposed adjacent to the planar surface 108 of the flywheel 100 and an exterior surface 116 on the opposite side of the clutch plate 102 from the interior surface 114. The mechanical member 104 is rigidly affixed to the center 118 of the clutch plate 102 and extends at least from the exterior side 116 of the clutch plate 102. The biasing means is disposed in the recess 110 of the flywheel 100 adjacent to the interior surface 114 of the clutch plate 102. The biasing means presses against the interior surface 114 of the clutch plate 102 is a direction urging the clutch plate 102 away from the planar surface 108 of the flywheel 100.

The retaining means 105 is disposed around the outer circumferential ridge 106 of the flywheel 100. The retaining means 105 is adjacent to the outer circumference of the exterior surface 116 of the clutch plate 102 when the clutch plate 102 is disposed within the recess 110 of the flywheel 100. The retaining means 105 extends partially from the outer circumferential ridge 106 inwardly toward the center 110 of the flywheel 100. The retaining means 105 retains the clutch plate 102 in the recess 110 of the flywheel 100 against the bias of the biasing means.

Figure 1:
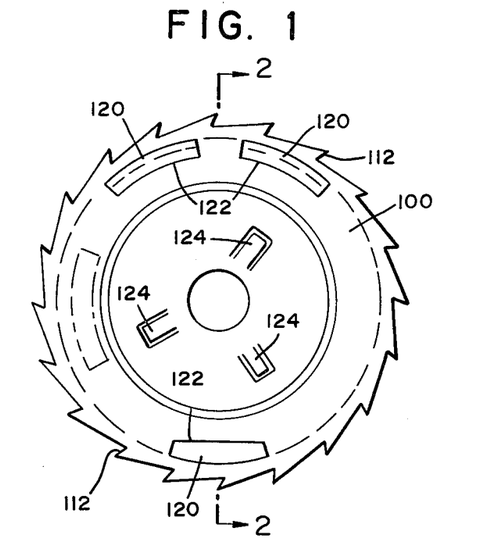
FIG. 1 is a front elevational view of a portion of a low torque embodiment of the present invention, showing a flywheel.

Referring to FIGS. 1, 5 and 7, the retaining means includes a plurality of arcuate fingers 120 disposed around the outer circumferential ridge 106 of the flywheel 100 on opposite sides of the clutch plate 102 from the biasing means, that is, adjacent to the outer circumference of the exterior surface 116 of the clutch plate 102. Three such fingers 120 may be used. The fingers 120 have arcuate ends 122 projecting from the outer circumference of the flywheel 100 toward the center 110 of the flywheel 100. The ends 122 define an interior circumference which is smaller than the outer circumference of the clutch plate 102. The fingers 120 thereby project partially over the exterior surface 116 of the clutch plae 102 and retain the clutch plate 102 in the recess 110 of the flywheel 100. The mechanical member 104 is a gear. The term "torque" refers to a force required to overcome the biasing means and turn the clutch plate and mechanical member 104 with reference to the flywheel 100 when the clutch plate and mechanical member 104 are disposed within the recess 110 of the flywheel 100.

Figure 2:
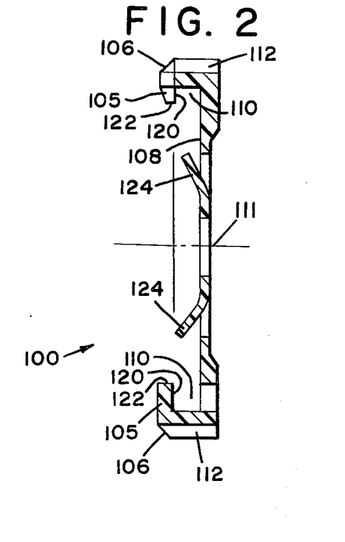
FIG. 2 is a sectional view of FIG. 1 along the lines 2—2 in FIG. 1.
Figure 3:
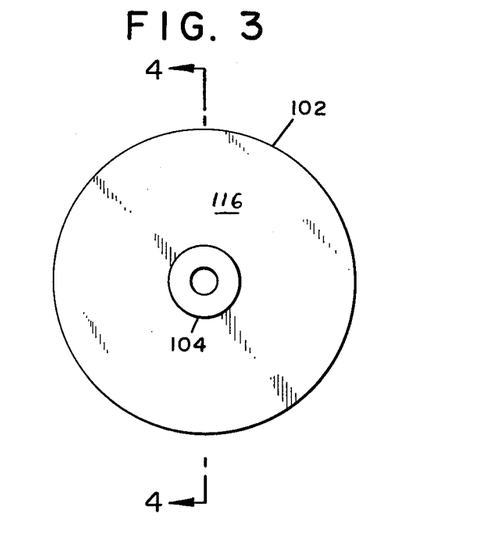
FIG. 3 is a front elevational view of a portion of a low torque embodiment of the present invention, showing a clutch plate.
Figure 4:
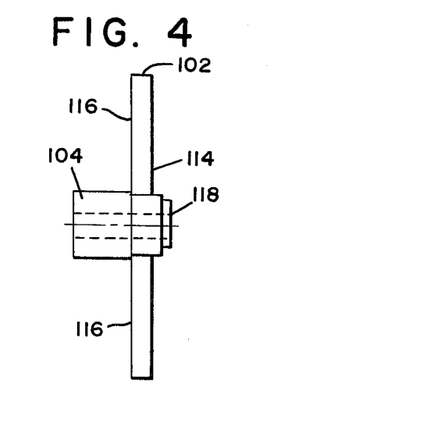
FIG. 4 is a sectional view of FIG. 3 along the lines 4—4 in FIG. 3.

Referring to FIGS. 1 and 2, in the lower torque embodiment, the biasing means includes: at least one cut-out portion 124 in the planar surface 108 of the flywheel. Three such cutout portions 124 may be used. The cut-out portions 124 are bent inwardly from the planar surface 108 toward the recess 110 of the flywheel 100 and toward the clutch plate 102. As a result, the cut-out portions 124 press against the clutch plate 102. When the clutch plate 102 is disposed in the recesses 110, the cut-out portions urge the clutch plate 102 away from the planar surface 108 and against the retaining fingers 120. The mechanical member 104 and the clutch plate 102 rotate together as one unit with reference to the flywheel 100 against a frictional force resulting from the press of the cut-out portions 124 against the clutch plate 102 when a predetermined, relatively low amount of torque is applied to the mechanical member 104, eg. 10 - 15 inch-ounces (a force in ounces per inch of leverage).

Referring to FIGS. 5 and 6, in the intermediate torque embodiment, the biasing means is a circular, bellows-type, leaf spring 130 disposed in the recess 110 between the plaanr surface 108 of the flywheel 100 and the interior surface 114 of the clutch plate 102. The leaf spring 130 urges the clutch plate 102 away from the planar surface 108. The mechanical member 104 and the clutch plate 102 rotate together as one unit with reference to the flywheel 100 against a frictional force resulting from the press of the leaf spring 130 against the clutch plate 102 when a predetermined, relatively intermediate amount of torque is applied to the mechanical member, e.g. 15–20 inch-ounces.

Referring to FIGS. 7 and 8, in the high torque embodiment, the biasing means is also a circular, belows-type, leaf spring 132 disposed in the recess 110 of said flywheel 100 between the planar surface 108 of the flywheel 100 and the interior surface 114 of the clutch plate 102. The spring 132 in the high torque embodiment has anti-rotation tabs 134 which extend into apertures in the flywheel 100 to engage the flywheel 100 and prevent rotation of the spring 132 with reference to the flywheel 100. The mechanical member 104 extends through an opening in the center of the clutch plate 102, through the recess 110 of said flywheel 100 through an opening in the center of the leaf spring 130, and a portion of the mechanical member 104 extends into an opening in the center of the flywheel 100. The mechanical member 104 and the clutch plate 102 rotate as one unit with reference to the flywheel 100. The mechanical member 104 rotates within the opening in the center of the planar surface 108 of the flywheel 100 against a frictional force resulting from the press of the leaf spring 130 against the clutch plate 102 and against the frictional resistance between the center of the planar surface 108 of the flywheel 100 and the portion of the mechanical member 104 extending therein when a predetermined, relatively high amount of torque is applied to the mechanical member 104, e.g. 18–35 inch-ounces.

Figure 9:
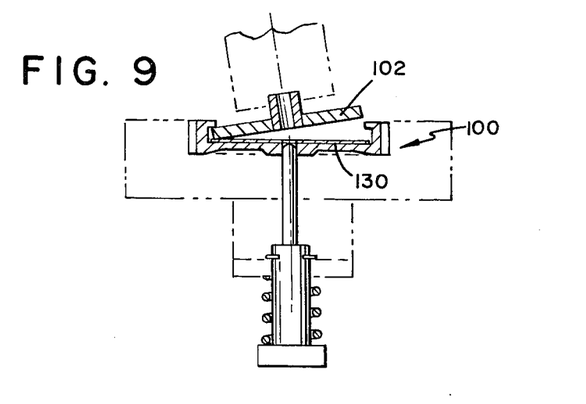
FIGS. 9, 10 and 11 are sectional views of the intermediate torque embodiment shown in FIG. 5 for the purpose of illustrating how the clutch plate is assembled into the flywheel.
Figure 10:
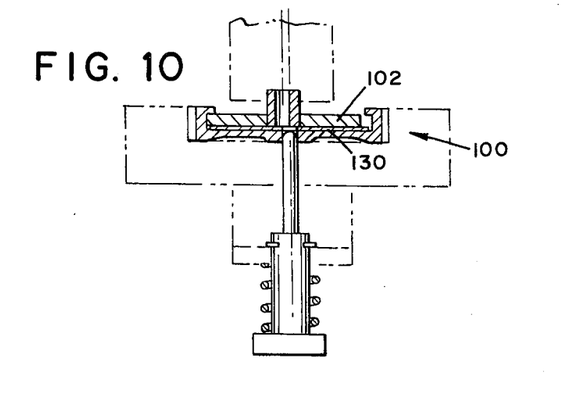
Figure 11:
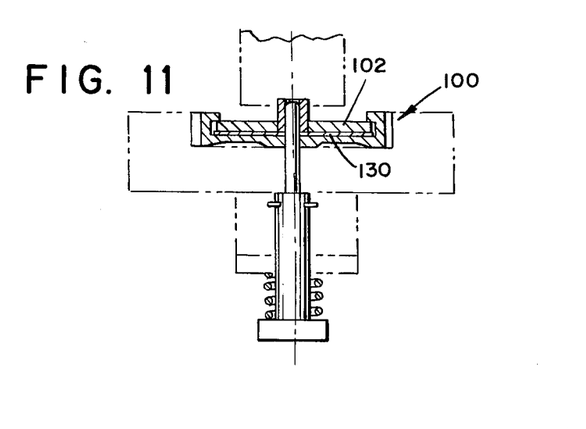

Referring to FIGS. 9–11, the improved flywheel and cluth mechanism may be assembled in the following manner. The biasing means for the intermediate torque and the high torque embodiments is inserted into the recess 110 of the flywheel 100. Then, a portion of the clutch plate 102 is inserted under one portion of the retaining means 105, in an off center configuration with reference to the flywheel 100, as shown in FIG. 9. Then the other portions of the clutch plate 102 are inserted in the recess 110, as shown in FIG. 10. Then, the clutch plate 102 is centered with reference to the flywheel 100, which brings all portions of the clutch plate 102 under the retaining means 105, as shown in FIG. 11.

Figure 12:
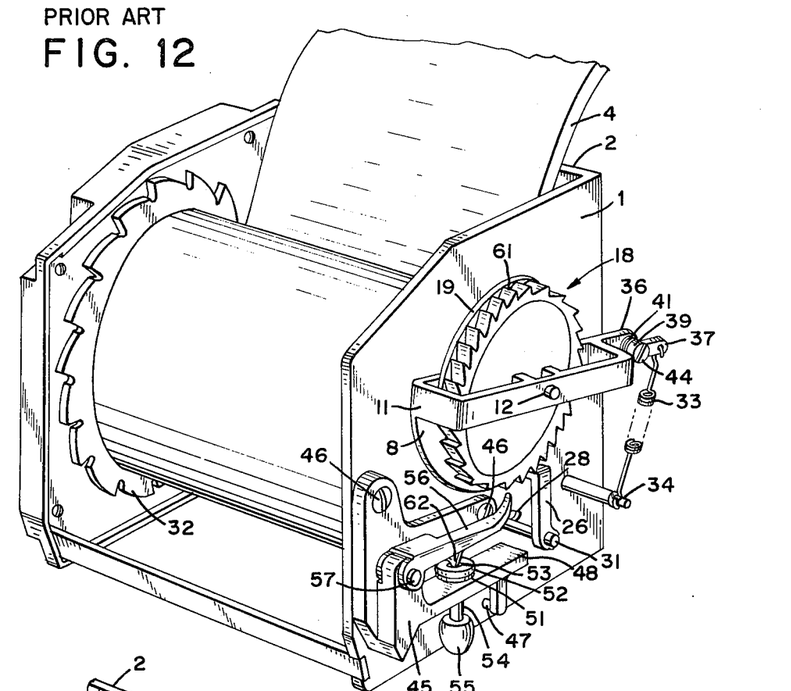
FIG. 12 is an isometric view of a prior art retractor in which the improved flywheel and clutch plate of the present invention may be used.
Figure 13:
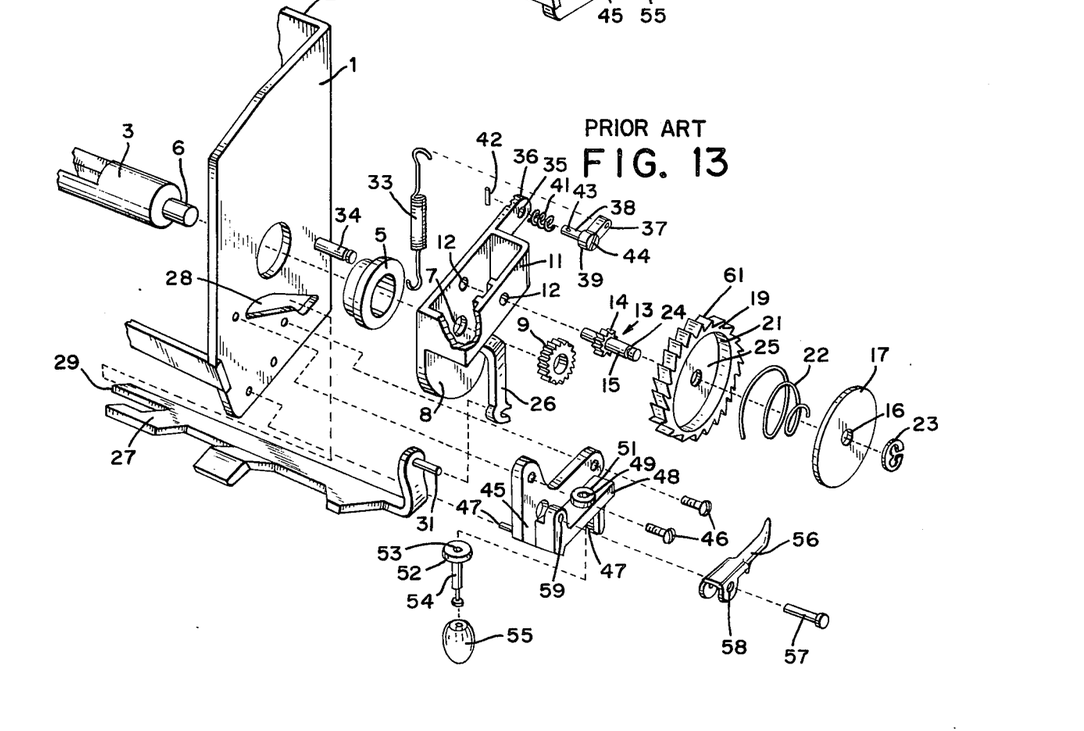
FIG. 13 is a partial exploded view of FIG. 12 showing a prior art flywheel and clutch mechanism which the present invention may replace.
Figure 14:
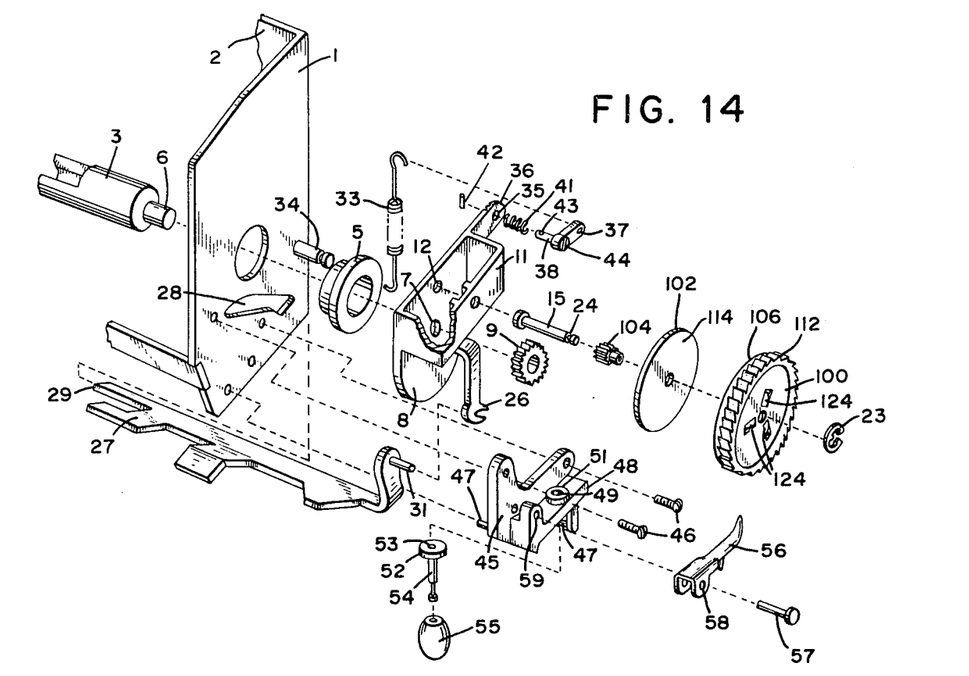
FIG. 14 is an exploded view of part of a retractor having the low torque embodiment of the present invention illustrated in FIGS. 1–4.
Figure 15:
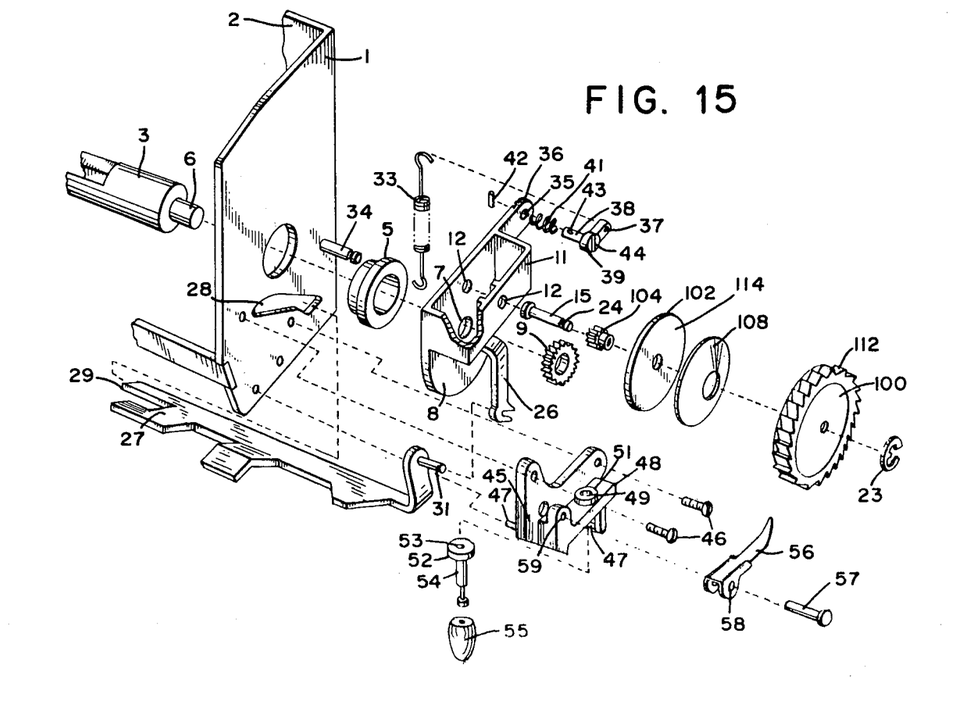
FIG. 15 is an exploded view of part of a retractor having the intermediate forque embodiment of the present invention illustrated in FIGS. 5 and 6.

The improved flywheel 100 and clutch plate 102 of the present invention may be used in place of the prior art elements 17, 19 and 22 in the prior art retractor shown in FIGS. 12 and 13. This is the retractor disclosed in U.S. Pat. No. 3,918,658. Referring to FIGS. 12 and 13, in this prior art retractor, numeral 1 is a wall extending from base 2 of the support. Shaft 3 is adapted for the connection of a seat belt 4 to be wound thereon and extends through wall 1 and bushing 5. Bushing 5 is one of two and each is inserted in one of the two support walls. Bushing 5 is preferably fabricated of nylon, Teflon, or similar polymeric material. Section 6 of shaft 3, preferably having a diameter less than that of the central portion of shaft 3, extends through opening 7 in rotatable plate 8 and terminates in driving spur gear 9 which is fixed thereon. This driving gear also serves to retain plate 8 adjacent to wall 1 and substantially in contact with the outer surface of the flange of bushing 5. Plate 8, having housing 11 preferably integrated therewith also has openings 12 into which the ends of spindle 13 are journaled for rotation. Spindle 13 carries pinion gear 14 fixed thereto and a cylindrical section 15 which is splined or has an off-round cross section for keyed engagement with opening 16 in clutch plate 17. The inertial wheel-clutch structure 18 is assembled by slipping inertial wheel 19 rotatably on splined section 15 of spindle 13 with recess 21 directed away from pinion gear 14. Prior art coiled spring 22, preferably conical, is placed in recess 21.

Prior art clutch plate 17 is then forced on splined section 15 to compress spring 22 and for a keyed relationship with this splined section. While held in this state of compression, fastening member 23, here whown as an open spring retaining washer, is forced into groove 24 on the spindle to complete the assembly.

Prior art inertial wheel 19 now rotates together with pinion gear 14 because of its frictional engagement with clutch plate 17 which is keyed to the spindle. If spindle 13 with fixed pinion gear 14 is turned, inertial wheel 19 turns with it in this preferred embodiment, but if spindle 13 is turned while inertial wheel 19 is held stationary, inertial wheel 19 slips with respect to rotating clutch plate 17 because of the frictional contact of both elements 17 and 19 with compressed spring 22. It would also be entirely workable to assemble the inertial wheel-clutch structure 18 by first sliding clutch plate 17 along splined section 15 until in contact with the inner surface 25 of recess 21, then urging spring 22 over the splined section 15 to compress it and while holding it thus in its compressed state, snapping spring retaining washer 23 into groove 24. Inner recessed surface 25 then presents a clutch surface against which clutch plate 17 is biased by coiled spring 22. Of course, many different types of resilient materials, such as a rubber or sponge rubber washer could be substituted for coiled spring 22 in this subassembly. This inertial wheel-clutch subassembly is snapped into housing 11 with the ends of the spindle journaled in openings 12. This is readily accomplished in the preferred embodiment shown, as the plate, housing and pawl-actuating arm 26 are preferably fabricated in one piece of nylon, Teflon or other similar polymeric material having the required degree of rigidity, yet also having sufficient flexibility to permit this method of assembly. The driven pinion gear 14 of the spindle is now positioned to engage driving gear 9.

In another embodiment the inertial wheel is fixed to the spindle and pinion gear and does not contain a clutch. This variation will be discussed in connection with the free swinging pendulum sensor to follow.

Pawl 27 is inserted through opening 28 in wall 1, with pivot end 29 inserted into a wedge shaped opening in the opposite support wall. Projecting extension 31 of the pawl extends through opening 28 for actuation adjacent to the outside surface of support wall 1. The bifurcated terminus of the pawl-actuating arm 26 engages projection 31 of the pawl, and when plate 8 is rotated back and forth on shaft extension 6, it rocks the pivotable pawl in and out of locking engagement with ratchet wheel 32.

The ratchet wheel 32 may be placed between the support walls adjacent to either one, or two ratchet wheels may be used, each being adjacent to an inner support wall, thus acting additionally as reel flanges for the seat belt webbing. Alternately, one ratchet wheel can be employed adjacent to the outer surface of support wall 1, being fixed to shaft 3 and disposed between the support wall and the plate. Preferably, it would rotate against the flange of bushing 5 and be separated from plate 8 by a washer to minimize any effect the rotation of the ratchet wheel would have on the rotatable plate 8. With such an arrangement, a pawl such as that shown, rotatable between the support walls, would not be necessary. A relatively short pawl, pivotally mounted in a support wall 1 to engage the ratchet wheel would not only suffice, but would have the advantage of being light in weight and therefore very responsive to actuating arm 26.

Biasing spring 33 is attached to fixed pin 34. It may be attached for providing fixed tension by using an opening such as opening 35 in tabular extension 36 of movable plate 8. Preferably a device for adjusting the tension of the biasing-spring 33 is used. This may consist of a series of holes in tabular extension 36 arranged vertically, or it may consist of an easily adjustable device such as that shown in FIGS. 1 and 2. The end of biasing spring 33 is inserted in opening 37 or rotatable cylindrical member 38 which is slideable and rotatable in opening 35. This member has a head with extension 39. Preferably this head is adapted for receiving a tool such as a screw driver or small wrench.

In the embodiment shown, coil spring 41 is placed over cylindrical member 38, said member then being inserted in opening 35 against the bias of spring 41 until rod 42 can be inserted in opening 43 of the cylindrical member. A number of equispaced channels on the side of the tabulation adjacent to support wall 1, radiate from the center of opening 35, each channel having a corresponding in-line channel on the opposite side of opening 35. Spring 41 retains rod 42 in a pair of in-line channels, and thereby fixes the position of extenson 39 and 37, and therefore the tension of biasing spring 33. If, however, a force is applied to head 39, as for example, by inserting a screw driver in slot 44, rod 42 will lift out of the channel in which it is lodged, and snap into another channel, thus increasing or decreasing the distance between opening 37 and fixed pin 34, and accordingly the tension applied by biasing spring 33 as desired. This tension is applied to the plate in a direction to rotate it and bifurcated arm 26 to its normally stationary position. In this position, the arm 26 in engagement with projection 31 of the pawl, retains the pawl out of engagement with ratchet wheel 32. Furthermore, the pawl is biased in this position by biasing spring 33, acting through arm 26.

With this arrangement, if the seat belt webbing is withdrawn uniformly as in buckling up or moving about in the seat, the rotation of the shaft will cause driving gear 9 to turn driven gear 14, and inertial wheel 19, without actuating the pawl. If, however, the webbing is rapidly accelerated as would occur if the wearer lurched forward as a result of a collision, the inertia of the inertial wheel would cause it to resist accelerated rotation sufficiently so that the driven gear 14 would "climb up" or rotate about driving gear 9. This would rotate movable plate 8 to which the driven gear 14 is rotatably attached, against its bias, and cause extending arm 26 to move projecting extension 31 of the pawl, hence pawl 27 into locking engagement with ratchet wheel 32, thereby preventing pay-out of the safety seat belt.

It will be noted that this particularly response occurs whether the inertial wheel is fixed to the spindle or attached thereto by means of a clutch.

The following description is directed to the sensor responsive to acceleration or deceleration of the vehicle to which the retractor is attached and to roll-over, if it is desired to adjust the sensor to include such response.

Pendulum support 45 is attached to support wall 1. In the embodiment shown, the support is fabricated of nylon, Teflon or other polymeric material and is attached to the support wall by screws 46 and projections 47. Platform 48 of the pendulum support has an opening 49 with a raised lip or collar 51. The pendulum comprises a button-shaped disc 52 preferably having a depression in its upper surface, 53. Beneath this button-shaped disc there extends perpendicularly, from a central point, pendulum shank 54 to which pendulum bob 55 is attached. The button-shaped disc normally rests on the surface of the platform over opening 49, or referably on collar 51 parallel to platform 48, with shank 54 extending through opening 49. The opening, collar and shank are fabricated to permit the pendulum to swing in any direction through an angle of about at least 40°.

Lever 56 is attached to the pendulum support 45 by inserting hinge pin 57 through openings 58 in the lever, and opening 59 in the pendulum support. Nodule 62 protruding from the underside of the lever new rests in the description in the upper surface of the button-shaped disc 52, or is disposed directly above it. If desired, to vary the degree of sensitivity, an adjusting screw is used, or the pendulum support is so shaped as to permit the lever to rest just above the button-shaped disc rather than directly on it.

The free end of the lever 56 does not normally touch the peripheral surface of inertial wheel 19, but is urged into such contact with the wheel when acceleration, deceleration or roll-over of the vehicle to which the retractor is attached, causes the pendulum to swing out of its normally vertical position. When this occurs, the button-shaped disc 52 rocks, raising lever 56 and causing the free end to contact the peripheral surface of inertial wheel 19. If the peripheral surface is smooth, milled, roughened, knurled, ribbed, or has a wavy texture, the rotary motion of the inertial wheel is inhibited. This action is analogous to the resistance of rotation that the inertial wheel offers when forced to accelerate rapidly. Thus, engagement of the lever with the wheel has substantially the same effect as is obtained upon rapid pay-out of the webbing. Because of inhibited rotation of the inertial wheel 19, the driven gear 14 attached thereto is urged to "climb up" or rotate about the driving gear 9 thereby rotating the movable plate 8 to which the driven gear is attached, and moving the actuating arm 26 to actuate the pawl 27 into locking engagement with ratchet wheel 32. The result is to prevent further extension of the safety belt.

Since the contact of the lever 56 with the types of peripheral surfaces mentioned, will permit slippage until the pawl 27 is fully locked with the ratchet wheel, no clutch is required. Such slippage between lever 56 and the inertial wheel, in fact, serves as a clutch.

In the preferred embodiment, however, the periphery of the inertial wheel is equipped with ratchet teeth 61 for engagement by lever 56, the free end of which is shaped for such engagement. In this embodiment, therefore, the lever 56 does more than inhibit rotation of the inertial wheel 19, it stops it positively and permits no further rotation of this wheel. For this reason, the ratchet teeth of the inertial wheel initiate the restraint of the belt. At this point any further extension of belt 4, however slight, causes the driven gear 14 which is now stationary in relation to the rotatable plate 8, to follow the rotation of the driving gear 9, and therefore to rotate the movable plate 8 and attached actuating arm 26 to urge the pawl 27 into locking engagement with the ratchet wheel. It should be noted that the motion of the belt need not be accelerating. Any motion produces the necessary locking action and it is not the weak effect of the pendulum that moves the ratchet bar, but the strong positive force of the belt on the shaft and driven gear. In a sense, the sensing pendulum serves as a relay, and it is the feed-back of the initial restraining action of the belt that brings about the positive action of the ratchet and pawl.

The initial restraint is brought about by the action of the lever on the ratchet teeth of the inertial wheel. The clutch 18 therefore become important in this preferred embodiment. Since normally the lever and inertial wheel would engage before the pawl and ratchet wheel, the clutch permits the restraining action to shift from the lightweight lever and inertial wheel to the heavy duty pawl and ratchet wheel, thus no significant strain is placed on the lever and inertial wheel as would be the case in the absence of the clutch.

The sensitivity of the pendulum sensor can be preselected in several different ways. By lightening the pendulum bob and shortening the shank on which it is suspended, the sensitivity to response is reduced. Raising the at-rest position of the lever slightly above the button-shaped disc has a similar effect. On the other hand, varying the tension on spring 33 in this instance has substantially no effect on the sensitivity of response. If the pendulum is to respond to roll-over, a relatively heavy pendulum bob is selected. If differentiation is desired between steep hills and roll-over, the lever can be adjusted, or the distance between the lever and inertial wheel, so that response is obtained only when the angle is greater than would be encountered on the highway.

We claim:

1. In a safety belt retractor for restraining an occupant in a vehicle in event of emergency conditions, said retractor having a spool and a locking mechanism for locking said spool, said locking mechanism including an improved flywheel and clutch mechanism comprising:

a polymeric flywheel having an outer circumference, a planar surface extending from the outer circumference of said flywheel toward the center of said flywheel, a ridge disposed around the outer circumference of said flywheel on at least one side of said planar surface, a recess in the interior of said flywheel, said recess formed by said outer circumferential ridge and said planar surface;

a clutch plate disposed within said recess of said flywheel, said clutch plate having an interior surface disposed adjacent to said planar surface of said flywheel and an exterior surface on the opposite side of said clutch plate from said interior surface, said clutch plate having frictional engagement with said flywheel whereby said clutch plate and said flywheel rotate together under normal conditions;

a mechanical member rigidly affixed to the center of said clutch plate and extending at least from said exterior side of said clutch plate, said mechanical member coupling said flywheel and said clutch plate to the retractor spool to rotate therewith;

a biasing means disposed in said recess of said flywheel adjacent to said interior surface of said clutch plate and pressing against said clutch plate in a direction urging said clutch plate away from the planar surface of said flywheel; and a retaining means disposed around the outer circumferential ridge of said flywheel, adjacent to the exterior surface of said clutch plate and extending partially from said outer circumferential ridge inwardly toward the center of said flywheel, said retaining means retaining said clutch plate in said recess of said flywheel against the bias of said biasing means.

2. The safety belt retractor according to claim 1 wherein said retaining means comprise:

a plurality of fingers disposed around the outer circumferential ridge of said flywheel on the opposite side of said clutch plate from said biasing means, said fingers having ends projecting from the outer circumference of said flywheel toward the center of said flywheel circle, said ends defining an interior circumference which is smaller than the outer circumference of said clutch plate, said fingers thereby projecting partially over said clutch plate and retaining said clutch plate in said recess of said flywheel.

3. The safety belt retractor according to claim 1 wherein said mechanical member in a gear.

4. The safety belt retractor according to claim 1 wherein:

said biasing means comprises at least one cutout portion in the planar surface of said flywheel, said cutout portion bent inwardly from said planar surface toward the recess of said flywheel and the clutch plate, said cut-out portion thereby pressing against said clutch plate, said mechanical member and said clutch plate rotating together as one unit with reference to said flywheel against a frictional force resulting from the press of said biasing means against said clutch plate when a predetermined, relatively low amount of torque is applied to said mechanical member.

5. The safety belt retractor according to claim 1 wherein:

said biasing means is a circular leaf spring disposed in said recess of said flywheel between said planar surface of said flywheel and said interior surface of said clutch plate; and said mechanical member and said clutch plate rotate together as one unit with reference to said flywheel against a frictional force resulting from the press of said leaf spring against said clutch plate when a predetermined, relatively intermediate, amount of torque is applied to said mechanical member.

6. The safety belt retractor according to claim 1 wherein:

said biasing means is a circular leaf spring disposed in said recess of said flywheel between said planar surface of said flywheel and said interior surface of said clutch plate;

said mechanical member extends through an opening in the center of said clutch plate, through said recess of said flywheel, through an opening in the center of said leaf spring, and a portion of said mechanical member extends into an opening in the center of said flywheel; and said mechanical member and said clutch plate rotating together as one unit with reference to said flywheel, said mechanical member rotating within the opening in said center of said planar surface of said flywheel, against a frictional force resulting from the press of said leaf spring against said clutch plate and against frictional resistance between the center of the planar surface of the flywheel and the portion of the mechanical member extending therein, when a predetermined, relatively high, amount of torque is applied to said mechanical member.

7. In a safety belt retractor for restraining an occupant in a vehicle in event of emergency conditions, said retractor including a spool and having a vehicle-sensitive locking mechanism and a belt-sensitive locking mechanism for locking said spool, said vehicle-sensitive locking mechanism including a lever, an improved flywheel and clutch mechanism forming a part of said vehicle-sensitive locking mechanism, said improved flywheel and clutch mechanism comprising:

a flywheel having an outer circumference, a planar surface extending from the outer circumference of said flywheel toward the center of said flywheel, a ridge disposed around the outer circumference of said flywheel on at least one side of said planar surface, a recess in the interior of said flywheel, said recess formed by said outer circumferential ridge and said planar surface, said ridge having an outer circumferential surface thereon, said outer circumferential surface having ratchet teeth thereon, said pawl located adjacent to said ratchet teeth, whereby said pawl can engage a ratchet tooth of said flywheel when said pawl is actuated by said vehicle-sensitive mechanism;

a clutch plate disposed within said recess of said flywheel, said clutch plate having an interior surface disposed adjacent to said planar surface of said flywheel and an exterior surface on the opposite side of said clutch plate from said interior surface, said clutch plate having frictional engagement with said flywheel whereby said clutch plate and said flywheel rotate together under normal conditions;

a mechanical member rigidly affixed to the center of said clutch plate and extending at least from said exterior side of said clutch plate, said mechanical member coupling said flywheel and said clutch plate to the retractor spool to rotate therewith;

a circular leaf spring disposed in said recess of said flywheel adjacent to said interior surface of said clutch plate and pressing against said clutch plate in a direction urging said clutch plate away from the planar surface of said flywheel; and a retaining means disposed around the outer circumferential ridge of said flywheel, adjacent to the exterior surface of said clutch plate and extending partially from said outer circumferential ridge inwardly toward the center of said flywheel, said retaining means retaining said clutch plate in said recess of said flywheel against the press of said leaf spring; and said mechanical member and said clutch plate rotating together as one unit with reference to said flywheel against a frictional force resulting from the press of said leaf spring against said clutch plate when a predetermined amount of torque is applied to said mechanical member.

* * * * *